(12) United States Patent
Wisgo

(10) Patent No.: US 9,619,216 B2
(45) Date of Patent: Apr. 11, 2017

(54) MODIFYING AN APPLICATION FOR MANAGED EXECUTION

(71) Applicant: Citrix Systems, Inc., Ft. Lauderdale, FL (US)

(72) Inventor: Jeffrey Wisgo, Tamarac, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 176 days.

(21) Appl. No.: 14/263,264

(22) Filed: Apr. 28, 2014

(65) Prior Publication Data

US 2015/0309811 A1 Oct. 29, 2015

(51) Int. Cl.
*G06F 9/44* (2006.01)
*G06F 9/45* (2006.01)
*G06F 9/445* (2006.01)
*G06F 21/54* (2013.01)
*H04W 4/00* (2009.01)

(52) U.S. Cl.
CPC ............... *G06F 8/52* (2013.01); *G06F 8/61* (2013.01); *G06F 8/71* (2013.01); *G06F 9/44521* (2013.01); *G06F 21/54* (2013.01); *H04W 4/00* (2013.01); *G06F 2221/2149* (2013.01)

(58) Field of Classification Search
CPC .................................................. G06F 9/44521
See application file for complete search history.

(56) References Cited

U.S. PATENT DOCUMENTS

| | | | |
|---|---|---|---|
| 2004/0107245 A1* | 6/2004 | Bodnar | G06F 17/30905 709/203 |
| 2008/0064383 A1* | 3/2008 | Nath | H04L 41/046 455/418 |
| 2009/0222787 A1* | 9/2009 | Aldahleh | G06F 9/4448 717/101 |

(Continued)

OTHER PUBLICATIONS

Stack Overflow, "Load a Mac binary as a dynamic library," retrieved from <http://stackoverflow.com/questions/8475476/load-a-mac-binary-as-a-dynamic-library> on Apr. 14, 2014.

(Continued)

*Primary Examiner* — Brian W Wathen
*Assistant Examiner* — Abdou Seye
(74) *Attorney, Agent, or Firm* — Banner & Witcoff, Ltd.

(57) ABSTRACT

Methods and systems for configuring mobile applications for managed execution are described herein. Executable application binaries may each be converted into a corresponding dynamic library. The dynamic libraries may be bundled with a managing application that is configured to manage execution of the dynamic libraries at a mobile computing device. Resource files consumed by the application binary may also be bundled with the managing application and accessible to the dynamic libraries during execution. The managing application may provide a workspace within which operation of the dynamic library occurs. Operation of the dynamic library may at least partially correspond to operation of the executable application binary. Execution of the dynamic library may be bound to a process that is executed for the managing application at a processor of a computing device.

24 Claims, 7 Drawing Sheets

(56) References Cited

U.S. PATENT DOCUMENTS

| | | | |
|---|---|---|---|
| 2012/0069748 A1* | 3/2012 | Van Den Bogaert | H04W 24/10 370/252 |
| 2012/0296959 A1* | 11/2012 | Momchilov | G06F 9/54 709/203 |
| 2013/0091543 A1* | 4/2013 | Wade et al. | 726/1 |
| 2013/0298185 A1* | 11/2013 | Koneru | G06F 15/173 726/1 |
| 2014/0059573 A1* | 2/2014 | Jawa et al. | 719/331 |
| 2014/0059642 A1* | 2/2014 | Deasy et al. | 726/1 |
| 2014/0059703 A1* | 2/2014 | Hung | G06F 21/53 726/28 |
| 2014/0195663 A1* | 7/2014 | Hirschenberger | H04W 4/046 709/223 |
| 2014/0282853 A1* | 9/2014 | Velammal | G06F 21/54 726/1 |

OTHER PUBLICATIONS

Jul. 9, 2015—(EP) International Search Report and Written Opinion—App PCT/US2015/024662.

Coscolla, Jordi, "Injecting Code to a ipa," retrieved from the Internet: URL:http://coscolla.net/injecting-code-to-a-ipa [retrieved on Jun. 8, 2015] XP055194308, Mar. 1, 2014.

"MDX Toolkit Documentation," XP055198432, retrieved from the internet: URL: http://support.citrix.com/servlet/KbServlet/download/37555-102-711237/MDXToolkit, [retrieved on Jun. 25, 2015], Mar. 17, 2014, pp. 1-48.

\* cited by examiner

MODIFYING AN APPLICATION FOR MANAGED EXECUTION

FIELD

Aspects described herein generally relate to software applications for mobile devices and other computing devices. More specifically, certain aspects described herein provide approaches for managing applications.

BACKGROUND

Mobile devices such as smart phones, personal digital assistants, tablet computers, and other types of mobile computing devices are becoming increasingly popular. Mobile devices are used in both personal and professional settings for a variety of purposes. Users may desire that their mobile devices be suitable for both personal and professional use. To this end, business might allow users to access business resources from their personal mobile devices but only if such businesses can secure sensitive information accessed at the mobile device. Various approaches have been attempted to secure personal mobile devices and mobile applications for use in a business setting. There remains, however, room for improvement.

Mobile device operating systems may impose limitations on the ability of mobile applications to communicate and collaborate at a mobile device. Inter-process communication (IPC) is one mechanism with which mobile applications might communicate at a mobile device. Some mobile device operating systems, however, may visually "flip" between mobile applications when communicating via IPC to the annoyance of the end user. In addition mobile device operating systems might function to put mobile applications into a "sleep" state if unused after a preset period of time which might impede communications between mobile applications. Therefore new approaches to application management are needed that overcome these and other limitations.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome the various limitations discussed above, and to overcome other limitations that will be apparent upon reading and understanding the present specification, aspects described herein are directed towards modifying the binary file of a mobile software application ("mobile application") such that application functionality may be managed during execution at a mobile computing device ("mobile device").

A first aspect described herein provides a method for configuring application binaries for managed execution. An executable application binary may be selected and converted into a dynamic library. The dynamic library may be included in a managing application that is configured to manage execution of the dynamic library.

A second aspect described herein provides a system for configuring application binaries for managed execution. The system may include at least one processor and memory storing instructions. The instructions, when executed by the at least one processor, may cause the system to receive a selection identifying an executable application binary. The system may convert the executable application binary into a dynamic library. The system may include the dynamic library in a managing application that is configured to manage execution of the dynamic library.

A third aspect described herein provides another method for configuring application binaries for managed execution. Multiple application binaries may each be converted into a corresponding dynamic library in order to obtain multiple dynamic libraries. The dynamic libraries may be included in a managing application that is configured to respectively manage execution of the dynamic libraries. The managing application may be installed on a computing device, and execution of at least one of the dynamic libraries may be managed when executing at the computing device.

According to additional aspects converting the executable application binary may include modifying a header of the executable application binary. Resource files associated with the executable application binary may be included in the managing application. The managing application may be configured such that the resource files are accessible to the dynamic library during execution. The managing application may provide a workspace when executing at a mobile device within which operation of the dynamic library occurs. Operation of the dynamic library may correspond, at least in part, to operation of the executable application binary. Execution of the dynamic library may be bound to a process that is executed for the managing application at a processor of a computing device.

According to additional aspects managing operation of the dynamic libraries may include facilitating communication between the dynamic libraries. Facilitating communication may include sharing a document associated with one of the dynamic libraries with another one of the dynamic libraries. Managing operation of the dynamic libraries may include a kiosk mode in which a user is prevented from exiting the workspace provided by the managing application. Managing the dynamic libraries may include prompting a user for login credentials during execution of the managing application, storing an indication of successful authentication, and providing the indication of successful authentication to one of the dynamic libraries in response to a login event. Managing operation of the dynamic libraries may also include simultaneously displaying at least a portion of a visual interface provided by one of the dynamic libraries and at least a portion of the visual interface provided by another one of the dynamic libraries. Managing operation of the dynamic libraries may also include customizing a notification generated by one of the dynamic libraries.

Managing operation of the dynamic libraries may also include managing network traffic associated with the dynamic libraries. Managing network traffic may include routing all network traffic associated with the dynamic libraries through a single virtual private network associated with the managing application. Managing network traffic may also include prioritizing network traffic associated with one of the dynamic libraries over network traffic associated with another one of the dynamic libraries.

Managing operation of the dynamic libraries may also include mapping user input received at an interface of the computing device to one of the dynamic libraries using the managing application. Managing operation of the dynamic libraries may also include adjusting a sleep status or a priority level of one of the dynamic libraries based on whether that dynamic library is in the foreground or the background at the managing application. Managing operation of the dynamic libraries may also include controlling input or output of a peripheral of the computing device based on which of the dynamic libraries is operating in the foreground at the managing application. The managing application may also apply a management policy stored at the computing device when managing execution of the dynamic libraries.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
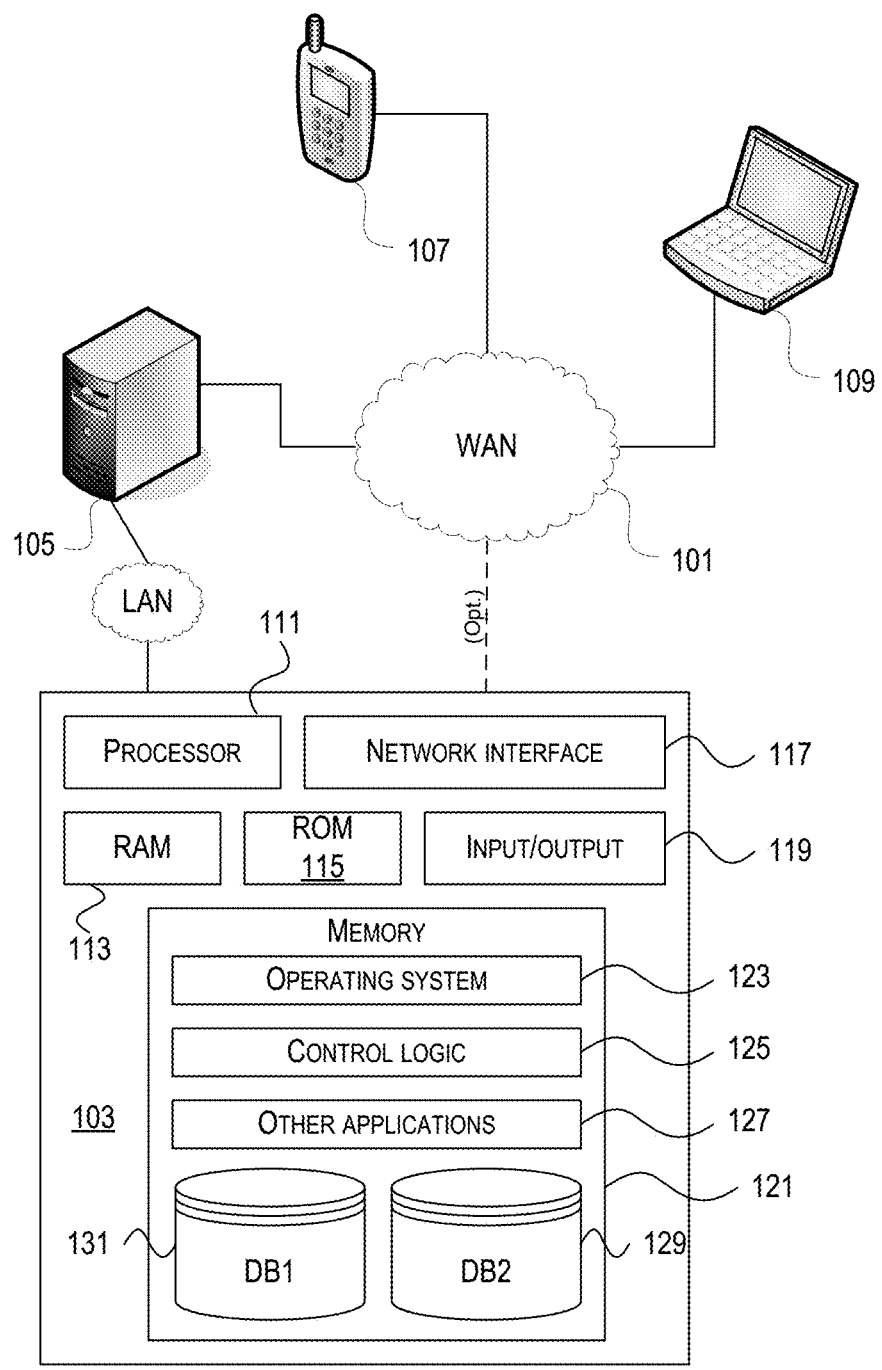
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed toward modifying the binary file of a mobile application such that operation of the mobile application may be managed during execution at a mobile computing device. The binary file of a mobile application may be converted into a dynamic library and bundled with another mobile application that manages operation of the dynamic library during execution at a mobile computing device. Those skilled in the art will recognize that a dynamic library refers to a library that is loaded at runtime during execution of a process and is bound to the executing process such that the process can invoke the behavior implemented by the library.

The managing application may be installed at a mobile computing device and provide a managed environment within which operation of the dynamic library occurs. Operation of the dynamic library may at least partially correspond to operation of the corresponding mobile application binary. Stated differently, the dynamic library executing at the mobile device may provide at least some of the same application functionality that the mobile application would provide during execution at the mobile device if the mobile application was installed and running natively at the mobile device. The dynamic library is described as providing at least some of the same application functionality due to the management policies the managing application may apply during execution of the dynamic library. As described further below, the managing application may restrict operation of the dynamic library at the mobile device by disabling or otherwise preventing various functions.

By managing mobile applications in this fashion, individuals associated with an enterprise may advantageously utilize enterprise resources at their personal mobile devices. Moreover the managed environment provided by the managing application provides new opportunities to manage multiple mobile applications at a mobile device. Such new opportunities provide various advantages with respect to communications between mobile applications, security, customization, networking, and interfacing with the end user. Additional details are described further below with reference to FIGS. 5-8.

The present disclosure describes, with reference to FIGS. 3-4 below, an alternative approach to configuring mobile applications for managed execution at a personal device of a user. In this alternative approach, a native mobile application is "wrapped" by an application management framework that applies management policies during execution of the native mobile application. In this alternative approach, each native application is wrapped with the application management framework. Additional details regarding wrapping native mobile applications for managed execution at a mobile device are provided in commonly-owned U.S. patent application Ser. No. 14/055,038 entitled "Application Wrapping for Application Management Framework" and filed on Oct. 16, 2013.

Figure 3:
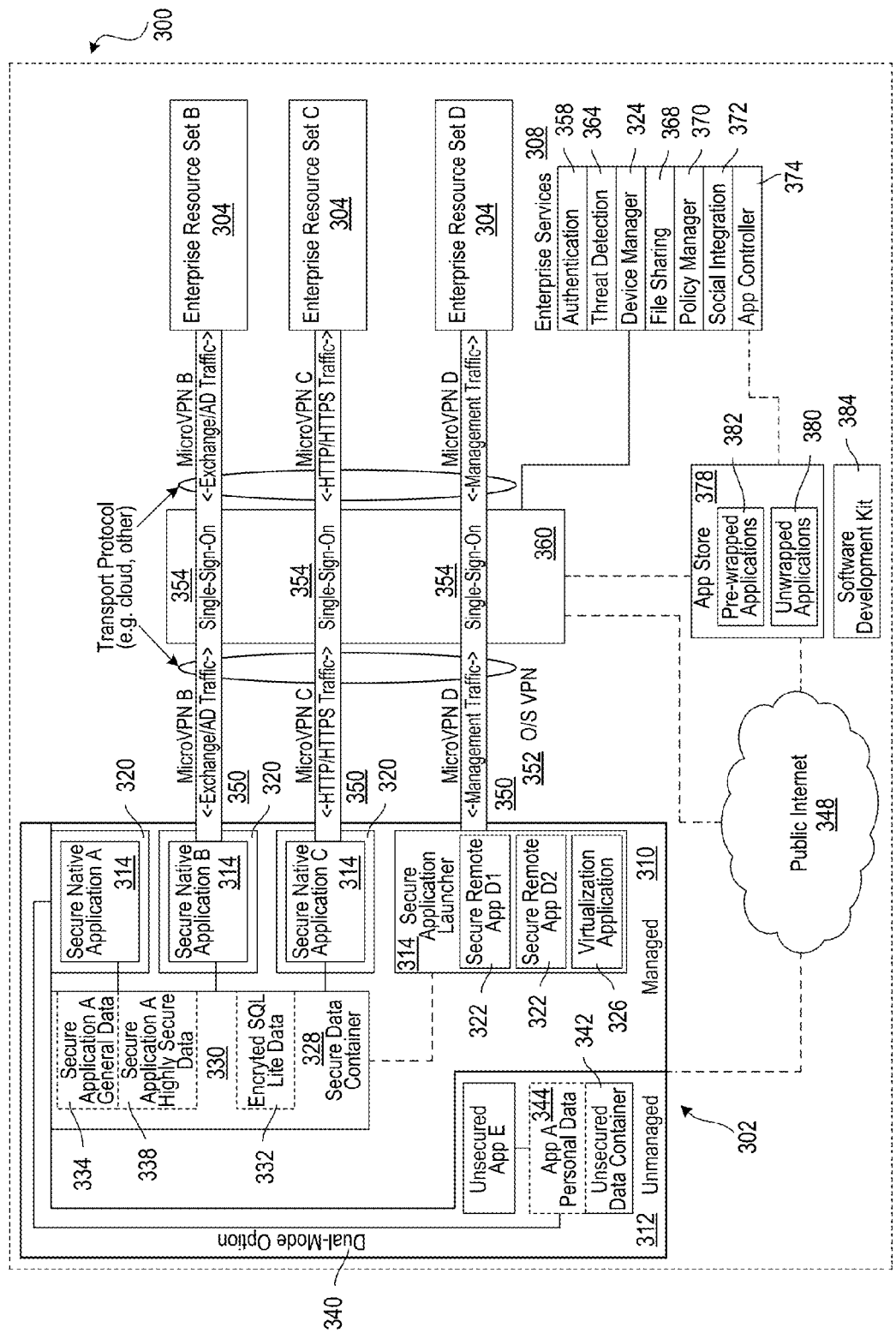
FIG. 3 depicts an illustrative enterprise mobility management system.
Figure 4:
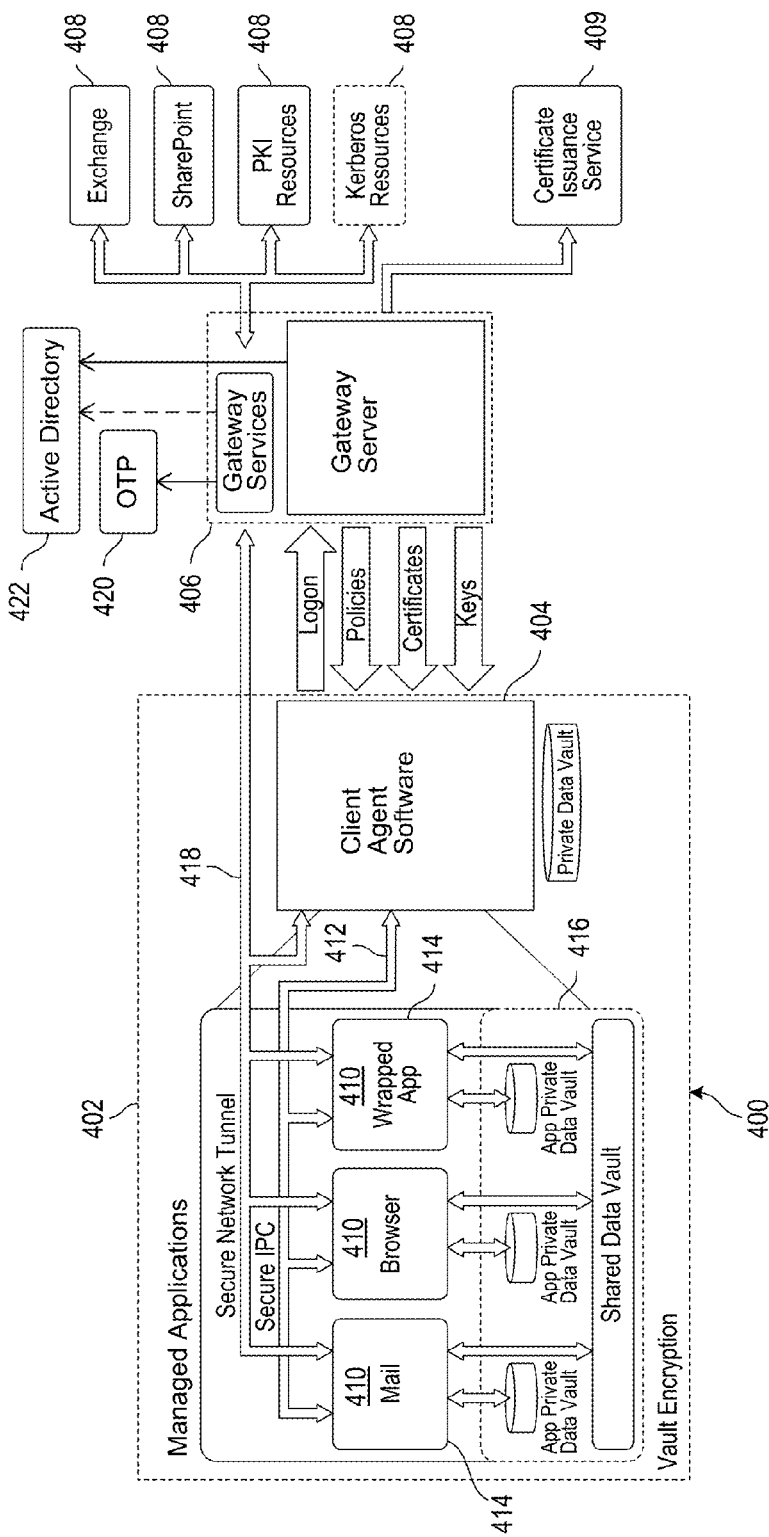
FIG. 4 depicts another illustrative enterprise mobility management system.

It will be appreciated, however, that both the approach described with reference to FIGS. 5-8 and the alternative approach described with reference to FIGS. 3-4 provide their own unique advantages. Either approach may be selectively implemented and employed to advantageously manage mobile applications at the personal devices of end users according to the needs, preferences, or capabilities of an enterprise; according to the circumstances in which the managed applications are deployed; or according to other criteria that will be recognized by those skilled in the art. The approach described below with reference to FIGS. 5-8 may be advantageously employed, for example, in situations where an enterprise does not have access to the source code of a mobile application it seeks to configure for managed execution, e.g., where the mobile application is a third-party mobile application and the enterprise only has access to the executable application binary of the mobile application and its associated resource files.

For convenience the following terminology is adopted for the present disclosure. The mobile application that manages operation of a dynamic library is referred to as a managing application. The managed environment provided by the managing application is referred to as a workspace. An executable whose operation or functionality is subject to a management policy, managed by the managing application, or otherwise controlled by the mobile application may generally be referred to as a managed executable. Executables may include application binaries as well as libraries consumed by application binaries. Accordingly managed executables may include managed applications and managed libraries.

It is to be understood that the phraseology and terminology used herein are for the purpose of description and should not be regarded as limiting. Rather, the phrases and terms used herein are to be given their broadest interpretation and meaning The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein. Computer-readable media as used in this disclosure includes all non-transitory computer-readable media and excludes transitory computer readable media such as propagating signals.

Figure 2:
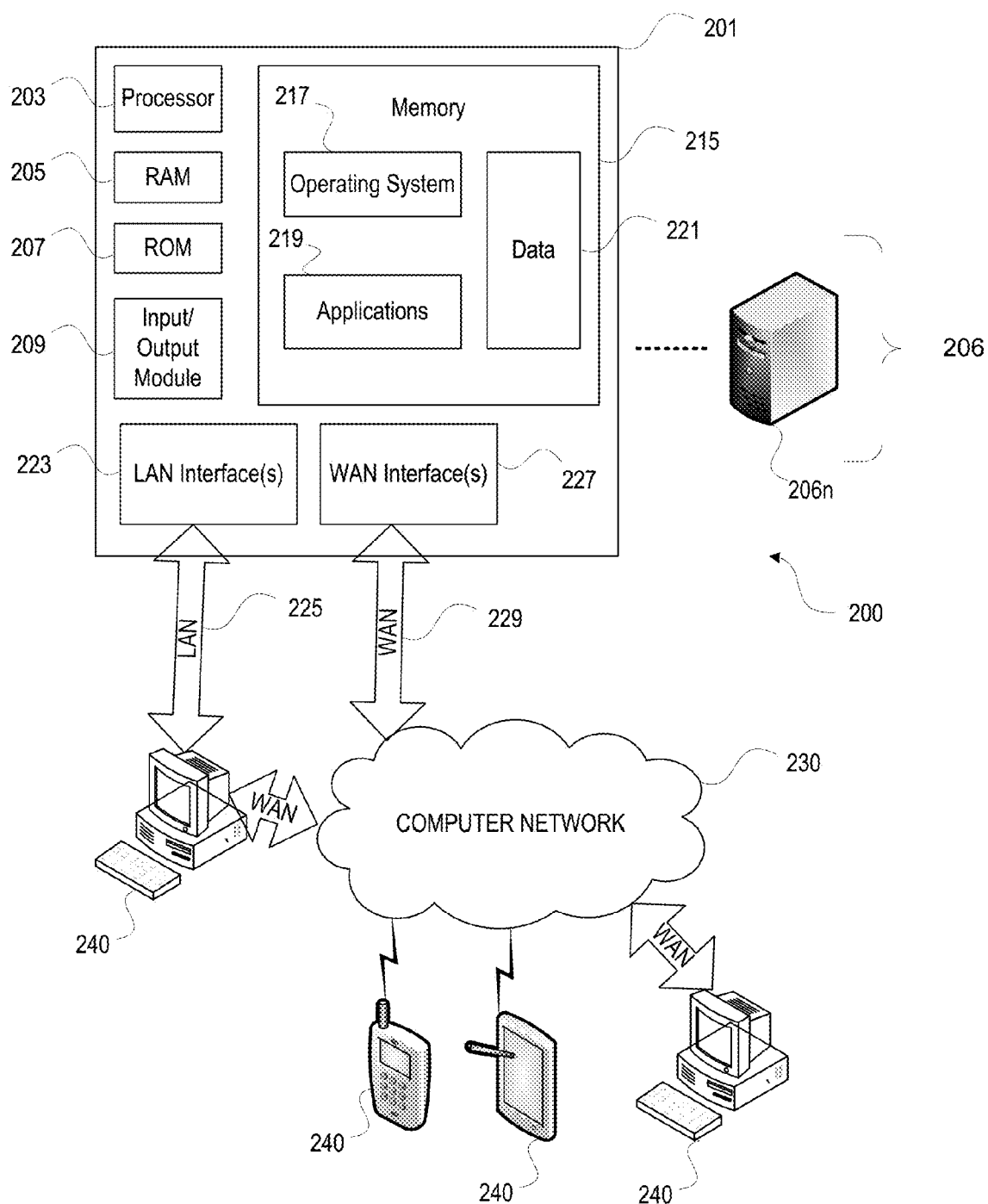
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

FIG. 3 represents an enterprise mobility technical architecture 300 for use in a BYOD environment. The architecture enables a user of a mobile device 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to user. The user may utilize the mobile device 302 for business use only or for business and personal use. The mobile device may run an iOS operating system, and Android operating system, or the like. The enterprise may choose to implement policies to manage the mobile device 304. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies may be referred to as an enrolled device.

In some embodiments, the operating system of the mobile device may be separated into a managed partition 310 and an unmanaged partition 312. The managed partition 310 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 328 in the managed partition 310 of the mobile device. The data secured in the secure data container may be accessed by the secure wrapped applications 314, applications executed by a secure application launcher 322, virtualization applications 326 executed by a secure application launcher 322, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as Advanced Encryption Standard (AES) 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured or unmanaged mode. In an unsecured or unmanaged mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 348 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections, also referred to as microVPN or application-specific VPN, may be specific to particular applications 350, particular devices, particular secured areas on the mobile device, and the like 352. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use User Interface.

A software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability 388. The management and analytics capability 388 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled mobile device 402 with a client agent 404, which interacts with gateway server 406 (which includes Access Gateway and application controller functionality) to access various enterprise resources 408 and services 409 such as Exchange, SharePoint, public-key infrastructure (PKI) Resources, Kerberos Resources, Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows apps/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and application management framework of this architecture act to provide policy driven management capabilities and features such as connectivity and SSO (single sign on) to enterprise resources/services 408. The client agent 404 handles primary user authentication to the enterprise, normally to Access Gateway (AG) with SSO to other gateway server components. The client agent 404 obtains policies from gateway server 406 to control the behavior of the managed applications 410 on the mobile device 402.

The Secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the Secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to Active Directory (AD) 422, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Illustrative Embodiments of Application Management Method

Figure 5:
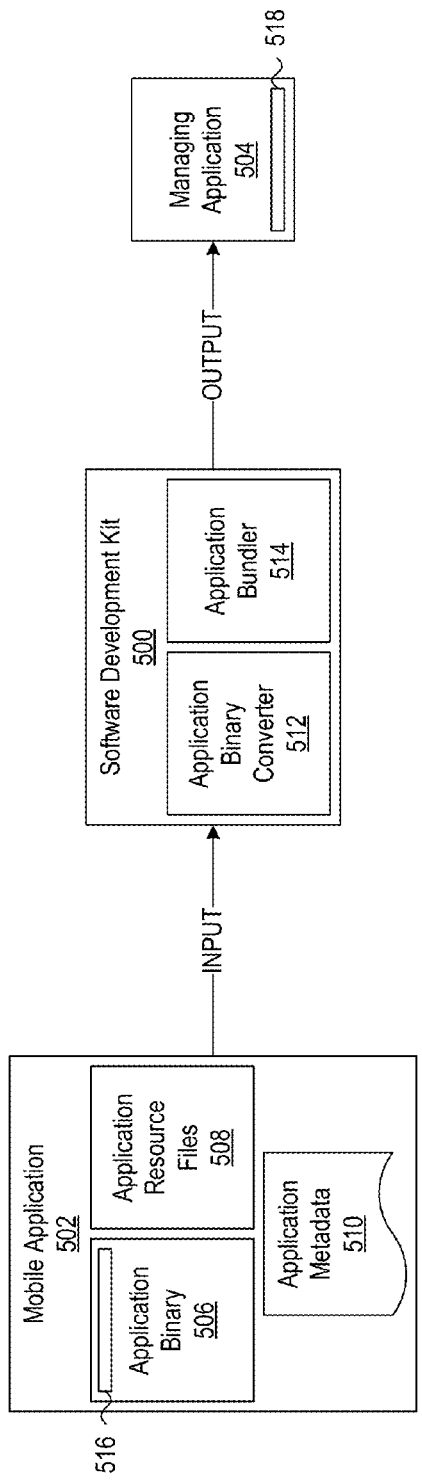
FIG. 5 depicts an illustrative system for configuring an application for managed execution at a mobile device.

FIG. 5 depicts an illustrative system for configuring an application for managed execution at a mobile device. As seen in FIG. 5, a software development kit 500 may be employed to accept as input a mobile application 502 and provide as output a managing application 504. The mobile application 502 may include an application binary 506, various application resource files 508, and application metadata 510. The software development kit 500 may include an application binary converter 512 ("converter") and an application bundler 514 ("bundler"). The application binary converter 512 may be configured to, in operation, convert the application binary 506 into a dynamic library. The application bundler 514 may be configured to, in operation, generate the managing application 504.

The mobile application 502 may be an application archive file that bundles the application binary 506, the application resource files 508, and the application metadata 510 into a single file. The application binary 506 may be the executable that is launched at a mobile device and that provides the functionality associated with the mobile application 502. Such functionality may include, for example, providing a graphical user interface (GUI) for display at the mobile device, accepting input from the user via an input device of the mobile device, and communicating with other applications or resources located at the mobile device or remotely located across a network. The application binary 506 may include a header 516 that serves as a signature for the application binary and identifies its format and structure. The application resource files 508 may be one or more computer files consumed by the application binary 506 during execution and include, for example, image files, sound files, style sheet files, and other types of application resource files that will be recognized by those skilled in the art. The application metadata 510 may include one or more information items that describe the mobile application 502 such as, for example, a unique application identifier, the developer name, the version, the release date, and other types of application metadata that will be recognized by those skilled in the art.

The software development kit 500 may facilitate converting the application binary 506 and creating the managing application 504. As shown in FIG. 5, for example, the software development kit 500 may include an application binary converter 512 configured to, in operation, convert the application binary 506 into a dynamic library 518. The software development kit 500 may also include an application bundler 514 configured to, in operation, create the managing application 504 that includes the dynamic library 518. It will be appreciated that the managing application 504 may include multiple dynamic libraries that each correspond to a respective application binary. The software development kit 500 may be, for example, a software development application or a software development platform. The converter 512 and the bundler 514 may be implemented as modules or routines of the software development kit 500. The converter 512 and the bundler 514 may also be implemented as stand-alone software applications.

The format of the application binary 506 may depend on the platform the mobile application 502 is configured to execute on. Two mobile platforms in widespread use today include the iOS platform provided by Apple, Inc. and the Android platform provided by Google, Inc. The description that follows is provided in the context of mobile applications configured to execute on the iOS platform. Those skilled in the art, however, will readily appreciate that the techniques and approaches described below may be adapted for mobile applications configured to execute on the Android platform as well as other platforms used to provide mobile computing capabilities. Therefore the conversion process described below with reference to the iOS platform is provided by way of example only. Alternative implementations of the conversion process for alternative platforms are thus intended to be within the scope of the present disclosure. It will also be appreciated that the techniques described below may be employed to convert applications binaries configured to run on non-mobile platforms as well.

On the iOS platform, the mobile application 502 may be an IPA file, and the application binary 506 may be structured according to the Mach-O file format. A Mach-O object includes a header, such as header 516, that identifies the object, includes file type information, and includes flags specifying options that affect interpretation of the object. A Mach-O object also includes a variable-sized series of load commands that specify, among other information, the names of dynamic libraries invoked by the object during execution at runtime. Additional details regarding Mach-O objects will be appreciated by those skilled in the art.

The converter 512 converts the application binary 506, in this example, by modifying the header 516 such that the application binary is instead interpreted as a dynamic library. To convert the application binary 506 to the dynamic library 518, the converter 512, in this example, sets the 'filetype' field in the header 516 of the application binary 506 to the Mach-O MH_DYLIB constant which is a value that identifies the object as a dynamic library. To suppress error messages that may result from converting the application binary 506 to the dynamic library 518, the converter 512 modifies the set of flags in the header 516 to set the Mach-O MH_NO_REEXPORTED_DYLIBS flag. The converter 512 then adds a new load command to the series of load commands in the header 516. The converter 512 may configure the new load command with the Mach-O LC_ID_DYLIB constant and other information required by the Mach-O command structure, e.g., the pathname for the dynamic library. The converter 512 then increments the 'ncmds' field (the total number of load commands) and the 'sizeofcmds' field (the total size of all the load commands) in the header 516 to account for the newly added load command. The converter 512 then changes the file extension to ".dylib" which is the file extension for dynamic libraries on the iOS platform. Due to the modifications made to the header 516, the converter 512 re-signs the dynamic library 518 to ensure that the dynamic library does not fail at runtime due to an invalid checksum. Having modified the application binary 506 in this fashion, managing application 504 may utilize the dynamic library 518 like a typical dynamic library during execution. This process may be repeated to convert multiple application binaries into corresponding dynamic libraries. Converting the application binary 506 may include, in some example implementations, creating a copy of the application binary 506 and performing the conversion process on that copy. In this example implementation, the mobile application 502 may thus remain intact at the conclusion of the conversion process. As noted above, the steps of the conversion process may be adapted for converting application binaries configured to execute on additional and alternative platforms.

Having obtained the dynamic library 518, the bundler 514 may then create the managing application 504. The bundler 514 may include the dynamic library 518 in the managing application. The bundler 514 may also copy the application resource files 508 into the managing application 504 in order to ensure proper execution of the dynamic library 518 at a mobile device. Stated differently the application bundler 514 bundles the dynamic library 518 and its corresponding application resource files 508 with the other components of the managing application 504. As described in further detail below with reference to FIG. 6, such additional components may include an application manager 520 and one or more management policies 522.

The managing application 504 may be configured to run natively at a mobile device, e.g., as an iOS mobile application or an Android mobile application. Once installed at a mobile device, an end user may launch the managing application 504 which provides a workspace within which the end user may selectively launch the dynamic libraries bundled with the managing application. Operation of the managing application and the dynamic libraries it includes will be discussed in further detail below.

Figure 6:
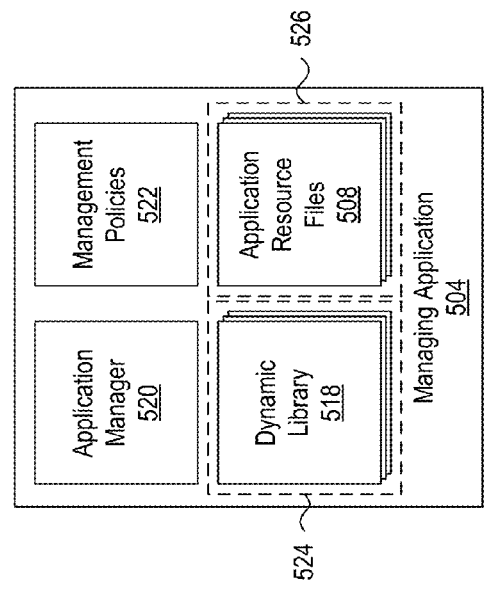
FIG. 6 depicts an illustrative managing application in accordance with one or more illustrative aspects described herein.

Referring now to FIG. 6, the managing application 504 is shown in further detail. As seen in FIG. 6, the managing application 504 includes a set 524 of one or more dynamic libraries 518. The managing application 504 also includes a set 526 of one or more application resource files 508. Each collection of application resource files 508 respectively corresponds to one of the dynamic libraries. The managing application 504, in this example, also includes an application manager 520 and one or more management policies 522 as mentioned above. The application manager 520 may be the main application binary of the managing application and may be configured to manage operation of the dynamic libraries 518 during execution at a mobile device. Managing operation of a dynamic library 518 may include applying one or more of the management policies 522 during execution of that dynamic library.

The application manager may provide application management functionality similar to that of the secure application wrapper 320 and the application management framework 414 discussed above with respective reference to FIGS. 3-4. For example, the application manager 520 may apply the management policies 522 to direct the dynamic libraries 518 to resources hosted at an enterprise computing system in a fashion similar to that of the secure application wrapper 320 and the application management framework 414. The managing application 504 may also refresh or update one or more of the management policies 522 using a gateway server such as the gateway server 406 of FIG. 4.

When launched at a mobile device, the managing application 504 may provide a workspace within which operation of the dynamic libraries 518 occur. The managing application may selectively load individual dynamic libraries 518 within that workspace, e.g., in response to selection of one of the dynamic libraries by the end user. The selected dynamic library 518 is then bound to the process executing at the processor of the computing device for the managing application 504. It will thus be appreciated that the managing application 504 may load and bind multiple dynamic libraries 518 to the process executing for the managing application. Within this workspace, operation of the application manager 520 with respect to the bundled dynamic libraries 518 may be analogous to operation of an operating system with respect to software applications installed at a computing device. Accordingly the managing application 504 may exercise OS-like control over operation of the dynamic libraries 518

The managing application 504 may be configured to perform various tasks associated with operation of the dynamic libraries 518 within the workspace. The managing application 504 may, for example, manage the drawing of a main visual interface for the workspace which may include one or more visual interfaces respectively provided by one or more dynamic libraries 518 operating within the workspace. The managing application 504 may manage drawing the main visual interface by hooking various user interface controller classes at the mobile device and determining their output. The managing application 504 may also be configured to map input received at the mobile device (e.g., touch gestures at a touch interface, keyboard presses, and so forth) to the appropriate dynamic library 518 operating within the workspace. The managing application 504 may map input to the dynamic libraries 518 based on, e.g., which dynamic library is in the foreground or has focus at the workspace. The managing application 504 may also map input to the dynamic libraries 518 based on the location of a visual interface of a dynamic library within the workspace. The managing application 504 may additionally control the sleep status and the priority level of the dynamic libraries 518 based on whether the dynamic libraries are in the foreground or the background of the workspace. The managing application may further control input and output of peripherals of the mobile device (e.g., the microphone, the speakers, the camera) based on which dynamic library 518 is in the foreground or has focus at the workspace.

Because the dynamic libraries 518 are bound to the same process, new opportunities for managing operation of those dynamic libraries are provided. One new management opportunity relates to communication between dynamic libraries during execution. Being bound to the same process, two of the dynamic libraries may communicate with each other without going outside the workspace provided by the managing application 504 (i.e., outside of the process the dynamic libraries are bound to). As a result communications between the dynamic libraries 518 are more secure relative to other communication mechanisms that would occur outside of that workspace (e.g., IPC communications facilitated by the operating system of a mobile device). The application manager 520 may implement a communication interface that facilitates the exchange of messages between dynamic libraries. Binding the dynamic libraries 518 to the managing application process also advantageously allows the dynamic libraries to communicate with each other even if those dynamic libraries are executing in the background. As used in this description, the background of the workspace refers to a "virtual background" that is separate from the background of the operating system of the computing device. The background of the workspace may be virtual in the sense that the application manager 520 may control which of the dynamic libraries are considered to be in the foreground or the background of the workspace. For example, the application manager 520 may selectively set a flag associated a dynamic library or otherwise mark the dynamic library to indicate whether that dynamic library is operating within the foreground or the background of the workspace provided by the managing application 504.

As an example, the dynamic libraries 518 may include dynamic libraries respectively corresponding to a mobile email client and a mobile document editor, e.g., an email client library and a document editor library. An end user may instruct the email client library to open an email attachment, and the application manager 520 may launch the document editor library in response. The application manager 520 may then facilitate communications between the email client library and the document editor library to share the email attachment with the document editor library. The communication exchange, in this example, may thus be highly secure as it occurs entirely within the boundaries of the workspace provided by the managing application 504 and is controlled by the application manager 520.

New management opportunities may also relate to the display of visual interfaces provided by the dynamic libraries 518 (e.g., GUIs). Current mobile platforms might be configured such that the mobile device only displays a single mobile application interface at any given time. The managing application 504 overcomes this limitation by binding the dynamic libraries to the managing application process. As a result, the application manager 520 may intercept display commands from the dynamic libraries 518 and control when and how a visual interface is presented at a mobile device. The application manager 520 may, for example, customize a visual interface of a dynamic library 518 and determine where that visual interface should be presented at the display screen of a mobile device. The application manager 520 may adjust the dimensions of the visual interface of a dynamic library 518. The application manager 520 may also intercept notifications generated by dynamic libraries 518 (e.g., alerts, status updates) and customize the notifications before presentation to the end user. The application manager 520 may control which dynamic libraries 518 appear in the foreground or the background at the workspace. The application manager 520 may also define unique gestures and custom commands for interacting the with dynamic libraries 518 at the mobile device. Custom commands may include, for example, logging out of the managing application, manually initiating an update to the management policies 522, and other types of custom commands that will be appreciated with the benefit of this disclosure.

The application manager 520 may also simultaneously display multiple visual interfaces within the workspace, e.g., positioned next to each other, stacked on top of each other, and so forth. As an example, the dynamic libraries 518 may include a chat library and a video player library. The application manager 520 may simultaneously display within the workspace a chat interface of the chat library next to a video playback interface of the video player library. An end user may thus chat with another individual via the chat interface while simultaneously watching playback of a video at the video playback interface. The application manager 520 may also simultaneously display within the workspace sidebars, toolbars, menus, icons, widgets, and other types interface elements that will be appreciated with the benefit of this disclosure.

As another example, the managing application 504 may be utilized to put the mobile device into a "kiosk mode." In the kiosk mode, the workspace provided by the managing application 504 may completely fill the display of the mobile device, and an end user may be prevented from exiting that workspace or disabling the kiosk mode. The managing application 504 may be configured to only allow an administrator to exit the workspace or disable the kiosk mode. In some example implementations, the managing application 504 may be configured such that only one of the dynamic libraries may operate within the workspace during the kiosk mode.

New management opportunities may additionally relate to authentication at the mobile device. Currently mobile applications each might perform authentication individually thus requiring a user to provide login credentials multiple times. Binding the dynamic libraries 518 to the managing application process allows for single sign-on authentication of the dynamic libraries 518 bundled with the managing application 504. Upon launch, the managing application 504 may prompt the end user to provide login credentials (e.g., username and password). The managing application 504 may, in some example implementations, utilize authentication services—such as authentication services 358 of FIG. 3—to authenticate the end user. In other example implementations, the managing application 504 itself may be configured to perform authentication of the user. The dynamic libraries 518 of the managing application may include, for example, an authentication library that handles authentication of the end user. The application bundler 514 may add the authentication library as part of the bundling process when creating the managing application 504. In alternative implementations, the application manager 520 may be configured to include the authentication functionality.

If successfully authenticated, the application manager 520 may store the received login credentials at the mobile device. A dynamic library 518 may thus have access to the stored login credentials. Being bound to the managing application process, a dynamic library 518 may thus utilize the stored access credentials in order to obtain authorization to access other resources requiring authentication of the end user, e.g., the enterprise resources 304 of FIG. 3. In this way, the managing application 504 may advantageously avoid repeated login prompts to the end user. The end user may login once upon launch of the managing application 504 with subsequent authentication processes facilitated by the application manager 520 using the stored login credentials. In some example implementations, the application manager 520 may store at the mobile device an indication of successful authentication or otherwise indicate that the user has been successfully authenticated. Various approaches to indicating that a user has been successfully authenticated will be appreciated by those skilled in the art and may be selectively employed. For example, the application manager may cause a username and password for the user in memory (e.g., volatile memory) at the computing device such that they may be consumed by other dynamic libraries during operation. The application manager may encrypt the login credentials via various secure encryption approaches that will be appreciated by those skilled in the art in order to protect the login credentials while stored in the memory of the computing device.

As an example, the dynamic libraries 518 may include an email client library. An end user may login to the managing application 504 upon launch, and the login credentials (or some other indication of successful authentication) for the end user may be stored at the mobile device. The email client library may be configured to access a remote mail server (e.g., the Exchange resource 408 of FIG. 4) in order to provide access to email services for the end user. Accessing the resource may include responding to a login event. Instead of again prompting the end user for login credentials, the application manager 520 may provide the stored login credentials (or the indication of successful authentication) to the email client library, which the email client library may then use for the login event in order to obtain authorization to access the remote mail server. Another one of the dynamic libraries 518 may subsequently use those stored login credentials to access another one of the enterprise resources without prompting the end user to login again.

Additional security features are provided by bundling multiple dynamic libraries in a single managing application. Should an enterprise need to revoke access to enterprise resources, the enterprise may issue a single lock or wipe command to the managing application rather than multiple commands to each managed application that may reside at a mobile device. In this way, an enterprise may advantageously lock or wipe all dynamic libraries at a mobile device with that single command. As a result, an enterprise may advantageously track only those end users that have installed a managing application at their mobile devices rather than each managed application end users may have installed.

New management opportunities may further relate to network traffic associated with the dynamic libraries. The managing application 504 may handle network traffic to and from the managing application in a fashion similar to the approach described above with reference to FIGS. 3-4. The managing application 504 may, for example, route network traffic through a gateway server (e.g., gateway server 406 of FIG. 4) via a microVPN. Because the dynamic libraries 518 are each bound to the managing application process, the network traffic for those dynamic libraries is also routed via the same microVPN. As a result, the application manager 520 may control the flow of network traffic to and from the dynamic libraries 518 during execution, e.g., control the flow of network requests, network responses, network packets, and so forth. The application manager 520 may, for example, give network traffic associated with one dynamic library 518 priority over network traffic associated with another dynamic library such that high priority packets are transmitted before low priority packets. The application manager 520 may also, for example, defer transmission of network traffic associated with a dynamic library 518 based on various criteria such as priority, bandwidth utilization, packet type (e.g., UDP, TCP), and other criteria that will be appreciated by those skilled in the art. The application manager 520 may also be configured to dynamically change the priority of network traffic associated with the dynamic libraries 518 or, additionally or alternatively, enable the end user to set network traffic priorities.

As an example the dynamic libraries 518 may include a video playback library and an audio playback library. An end user may launch the video playback library to stream video from a remote video service and launch the audio playback library to stream audio from a remote audio service. The user may decide to receive high-quality video rather than high-quality audio and thus set the priority of network traffic to the video playback library as high-priority and set the priority of network traffic to the audio playback library as low-priority. The application manager 520 may thus shape the network traffic received at the managing application 504 such that the video playback library traffic is prioritized over the audio playback library traffic.

Figure 7:
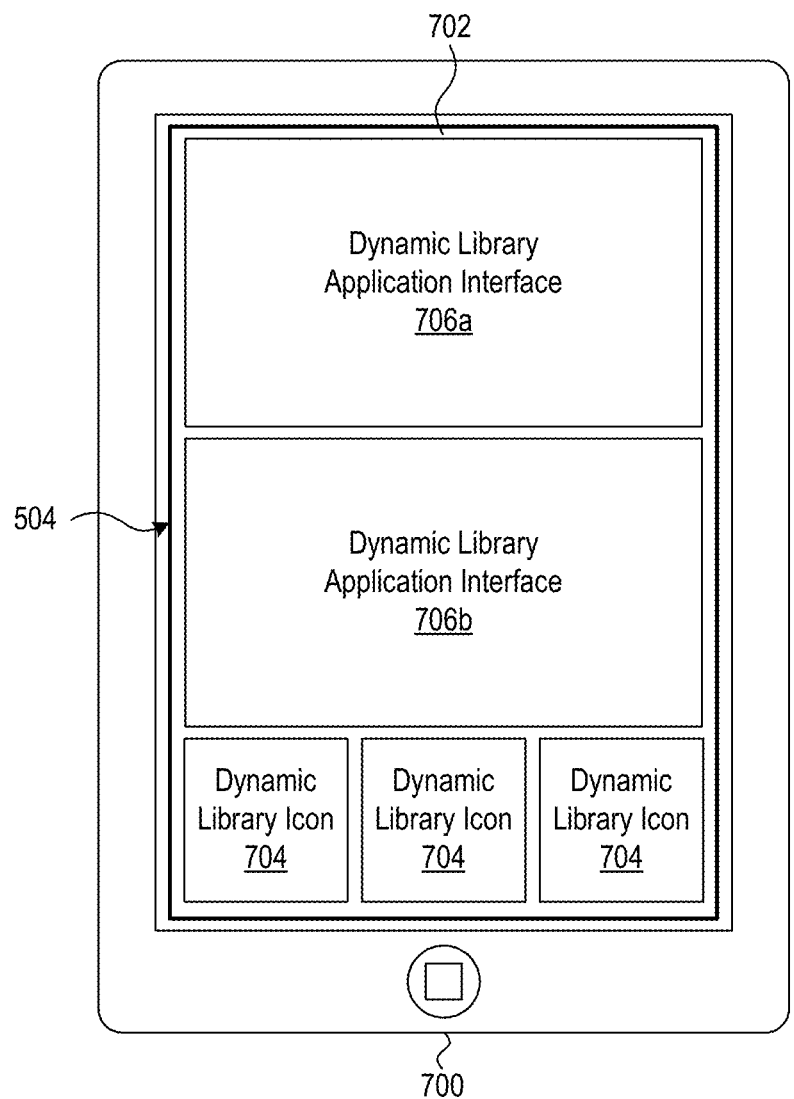
FIG. 7 depicts a mobile device at which is installed an illustrative managing application in accordance with one or more illustrative aspects described herein.

Referring now to FIG. 7, a mobile device 700 is shown at which is installed a managing application such as managing application 504. As described above, the managing application 504 may run natively at the mobile device 700 a provide a workspace 702 within which the dynamic libraries 518 operate. Within the workspace 702, the managing application 504 may provide user interface elements for launching the dynamic libraries 518. As shown by way of example in FIG. 7, the managing application 504 may display within the workspace 702 one or more icons 704 that respectively correspond to one of the dynamic libraries 518 bundled with the managing application 504. An end user may select one of the dynamic library icons 704 to launch the corresponding dynamic library.

As mentioned above, the managing application 504 may manage the visual interfaces provided by the dynamic libraries 518 in order to enhance the user interface capabilities at a mobile device. As also shown by way of example in FIG. 7, the managing application 504 may simultaneously display multiple application interfaces 706a and 706b provided by different dynamic libraries 518 respectively. Additional examples will be appreciated with the benefit of this disclosure.

Figure 8:
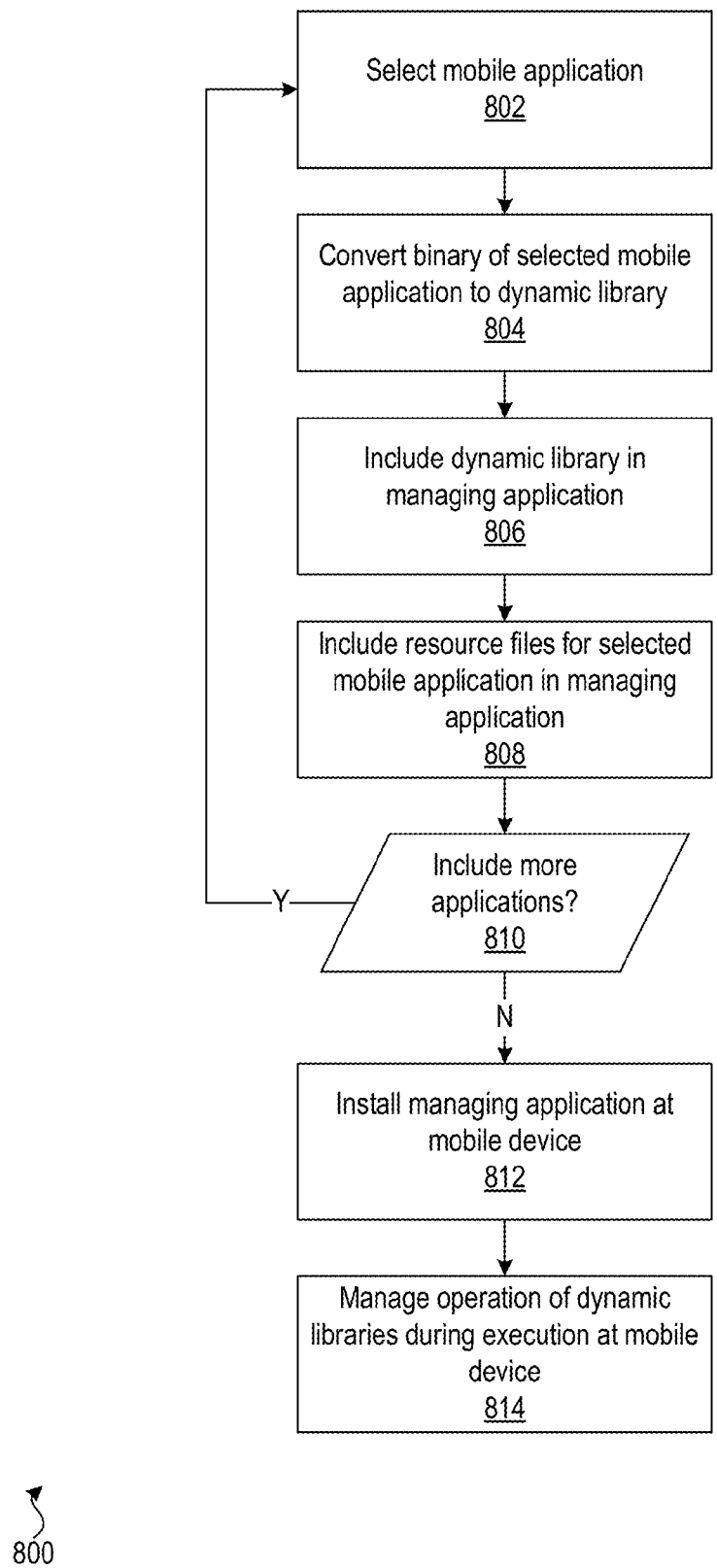
FIG. 8 depicts a flowchart of example method steps for managing a mobile application in accordance with one or more illustrative aspects described herein.

In FIG. 8, a flowchart 800 of example method steps for managing a mobile application is shown. An administrator at an enterprise may utilize a software development kit to configure a mobile application for managed execution at a mobile device. The software development kit may be available at a computing device accessible to the administrator. The administrator may first select a mobile application (block 802) to configure for managed execution. The software development kit may display a list of mobile applications available for selection. Mobile applications may be selected and configured one-at-a-time using the software development kit or, additionally or alternatively, multiple mobile applications may be selected and configured as part of a batch job executed by the software development kit.

An application binary converter may convert the application binary of the selected mobile application into a dynamic library (block 804) as described above. An application bundler may then include that dynamic library in a managing application (block 806) as also described above. The application bundler may also include in the managing application any resource files in the mobile application that are consumed by the application binary during execution (block 808). As noted above, a managing application may bundle multiple dynamic libraries. Therefore the administrator may choose to select additional applications to bundle with the managing application (block 810:Y) and repeat the application selection, conversion and bundling steps above to include additional dynamic libraries in the managing application.

Having selected all the desired mobile applications to include as dynamic libraries in the managing application (block 812:N), the managing application may be made available for installation at one or more mobile devices. As an example, the managing application may be uploaded to a storage server of an application distribution platform. The application distribution platform may then present the managing application to end users at an application storefront and facilitate transmission of the managing application to a mobile device in response to receipt of a request to install the managing application at that mobile device. Upon receipt of the managing application, the mobile device may install the managing application (block 812) which may run natively at the mobile device as described above. During execution of the managing application, an end user may launch and utilize the dynamic libraries within a workspace provided by the managing application. As also noted above, operation of a dynamic library may correspond, at least in part, to operation of its corresponding mobile application as if that mobile application was natively executing at the mobile device. The managing application may, however, manage operation of the dynamic libraries during execution at the mobile device (block 814), e.g., to apply management policies that restrict certain functionality of the dynamic libraries or to provide enhancements related to communication, security, network traffic, and user interfaces as described above.

Although the subject matter has been described in language specific to structural features and methodological acts, it is to be understood that the subject matter defined in the appended claims is not necessarily limited to the specific features or acts described above. Rather, the specific features and acts described above are described as example implementations of the following claims.

What is claimed is:

1. A method comprising:
selecting an executable application binary;
converting the executable application binary into a dynamic library;
bundling the dynamic library in a managing application configured to manage execution of the dynamic library;
bundling one or more resource files associated with the executable application binary in the managing application; and
configuring the managing application such that the one or more resource files are accessible to the dynamic library during execution.

2. The method of claim 1 wherein converting the executable application binary includes modifying a header of the executable application binary.

3. The method of claim 1 wherein:
the dynamic library is one of a plurality of dynamic libraries bundled in the managing application that were converted from respective executable application binaries.

4. The method of claim 1 wherein:
the managing application, when executing at a computing device, provides a workspace within which operation of the dynamic library occurs; and
operation of the dynamic library corresponds, at least in part, to operation of the executable application binary.

5. The method of claim 4 wherein:
execution of the dynamic library is bound to a process that is executed for the managing application at a processor of the computing device.

6. A system comprising:
at least one processor; and
memory storing instructions that, when executed by the at least one processor, cause the system to
receive a selection identifying an executable application binary,
convert the executable application binary into a dynamic library,
bundle the dynamic library in a managing application configured to manage execution of the dynamic library,
bundle one or more resource files associated with the executable application binary in the managing application; and
configure the managing application such that the one or more resource files are accessible to the dynamic library during execution.

7. The system of claim 6 wherein:
the instructions, when executed by the at least one processor, further cause the system to modify a header of the executable application binary.

8. The system of claim 6 wherein:
the dynamic library is one of a plurality of dynamic libraries bundled in the managing application that were converted from respective executable application binaries executables.

9. The system of claim 6 wherein:
the managing application, when executing at a computing device, provides a workspace within which operation of the dynamic library occurs; and
operation of the dynamic library corresponds, at least in part, to operation of the executable application binary.

10. The system of claim 9 wherein:
execution of the dynamic library is bound to a process that is executed for the managing application at a processor of the computing device.

11. A method comprising:
converting each of a plurality of executable application binaries into a corresponding dynamic library to obtain a plurality of dynamic libraries;
bundling the plurality of dynamic libraries in a managing application configured to respectively manage execution of the plurality of dynamic libraries;
installing the managing application at a computing device; and
managing execution of at least one of the dynamic libraries at the computing device.

12. The method of claim 11 wherein:
managing operation of at least one of the dynamic libraries includes facilitating communication between one of the dynamic libraries and another one of the dynamic libraries.

13. The method of claim 12 wherein:
facilitating communication includes sharing a document associated with one of the dynamic libraries with another one of the dynamic libraries.

14. The method of claim 11 wherein:
the managing application, when executing at the computing device, provides a workspace within which operation of at least one of the dynamic libraries occurs; and
managing operation of at least one of the dynamic libraries includes initiating a kiosk mode in which a user is prevented from exiting the workspace.

15. The method of claim 11 further comprising:
prompting for login credentials during execution of the managing application at the computing device;
performing an authentication using the login credentials received;
storing an indication of successful authentication; and
providing the indication of successful authentication to one of the dynamic libraries in response to a login event.

16. The method of claim 11 wherein:
managing operation of at least one of the dynamic libraries includes simultaneously displaying at the computing device
i) at least a portion of a first visual interface provided by a first one of the dynamic libraries, and
ii) at least a portion of a second visual interface provided by a second one of the dynamic libraries.

17. The method of claim 11 wherein:
managing operation of at least one of the dynamic libraries includes customizing a notification generated by one of the dynamic libraries.

18. The method of claim 11 wherein:
managing operation of at least one of the dynamic libraries includes managing network traffic associated with at least one of the dynamic libraries.

19. The method of claim 18 wherein:
managing network traffic includes routing all network traffic associated with the plurality of dynamic libraries through a single virtual private network associated with the managing application.

20. The method of claim 18 wherein:
managing network traffic includes prioritizing first network traffic associated with a first one of the dynamic libraries over second network traffic associated with a second one of the dynamic libraries.

21. The method of claim 11 further comprising:
mapping user input received at an interface of the computing device to one of the dynamic libraries using the managing application.

22. The method of claim 11 further comprising:
adjusting, using the managing application, at least one of i) a sleep status of and ii) a priority level of one of the dynamic libraries based on whether that dynamic library is in a foreground or a background at the managing application.

23. The method of claim 11 further comprising:
controlling, using the managing application, at least one of input and output at a peripheral of the computing device based on which of the dynamic libraries is operating in a foreground at the managing application.

24. The method of claim 11 wherein:
the managing application applies a management policy stored at the computing device when managing execution of at least one of the dynamic libraries.

\* \* \* \* \*